United States Patent [19]

Andersson et al.

[11] Patent Number: 6,022,388
[45] Date of Patent: Feb. 8, 2000

[54] DEVICE FOR CLEANING FILTER ELEMENTS

[75] Inventors: Bernt Andersson, Alvesta; Ulf Alterby, Solna, both of Sweden

[73] Assignee: ABB Fläkt AB, Stockholm, Sweden

[21] Appl. No.: 09/091,056

[22] PCT Filed: Jan. 22, 1997

[86] PCT No.: PCT/SE97/00100

§ 371 Date: Jun. 9, 1998

§ 102(e) Date: Jun. 9, 1998

[87] PCT Pub. No.: WO97/26976

PCT Pub. Date: Jul. 31, 1997

[30] Foreign Application Priority Data

Jan. 23, 1996 [SE] Sweden ................................. 9600247

[51] Int. Cl.⁷ ................................................. B01D 46/04
[52] U.S. Cl. ............................................. 55/302; 95/280
[58] Field of Search ........................ 55/302, 293; 95/280, 95/279

[56] References Cited

U.S. PATENT DOCUMENTS

| | | | |
|---|---|---|---|
| 1,995,650 | 3/1935 | Rathbun | 55/294 |
| 3,837,150 | 9/1974 | Kubiak | 55/297 |
| 4,319,897 | 3/1982 | Labadie | 55/302 |
| 4,775,398 | 10/1988 | Howeth | 55/302 |
| 5,062,867 | 11/1991 | Klimczak | 55/302 |
| 5,180,110 | 1/1993 | Brame | 55/302 |
| 5,395,409 | 3/1995 | Klimczak | 55/302 |
| 5,533,706 | 7/1996 | Aurell | 55/302 |
| 5,549,734 | 8/1996 | Standard | 55/302 |
| 5,571,299 | 11/1996 | Tonn | 55/302 |

FOREIGN PATENT DOCUMENTS

| | | |
|---|---|---|
| 407903 | 4/1979 | Sweden . |
| 501977 | 7/1995 | Sweden . |

*Primary Examiner*—Duane S. Smith
*Attorney, Agent, or Firm*—Burns, Doane, Swecker & Mathis, L.L.P.

[57] ABSTRACT

A device for cleaning filter elements, such as filter bags, having upper open ends, in a filter installation for filtering polluted gas. The gas passing, during operation, from the outside and through said filter elements, in which installation filter elements are juxtaposed in a plurality of essentially parallel rows. The device includes an essentially horizontal distribution pipe, which extends essentially in parallel with the rows of filters elements and is adapted to be connected to a pressure medium source via a valve. The device further includes a plurality of nozzle elements, which are connected to the distribution pipe. The nozzle elements are adapted to direct pressure medium pulses into the upper open ends of the filter elements in at least two juxtaposed rows of filter elements.

20 Claims, 2 Drawing Sheets

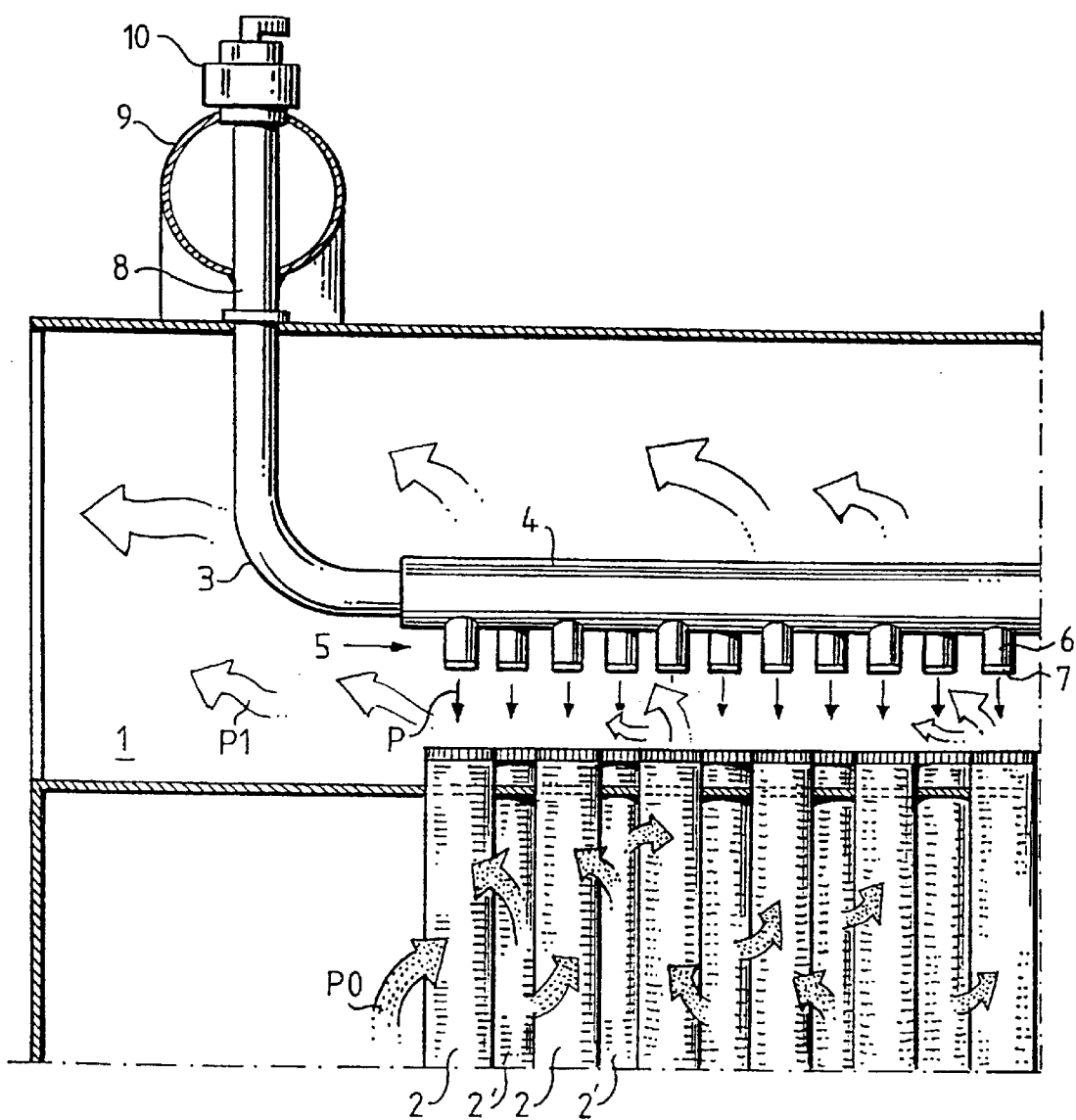

DEVICE FOR CLEANING FILTER ELEMENTS

FIELD OF THE INVENTION

The present invention relates to a device for cleaning filter elements, such as filter bags, having upper open ends, in a filter installation for filtering of polluted gas passing, during operation, from the outside and through said filter elements (2, 2'). The filter elements in the installation are juxtaposed in a plurality of essentially parallel rows. The device has an essentially horizontal distribution pipe, which extends essentially in parallel with the rows of filter elements and is adapted to be connected to a pressure medium source via a valve. The device further comprises a plurality of nozzle elements, which are connected to the distribution pipe.

DESCRIPTION OF THE PRIOR ART

A known filter installation of the above-mentioned type consists of a plurality of parallel filter chambers, each containing a plurality of parallel rows of vertically arranged filter elements in the form of filter bags having upwardly directed openings. A polluted gas, from which dust is to be separated, is conducted through the filter chambers to be filtered and cleaned. The polluted gas is conducted into the filter bags via the walls thereof, and the cleaned gas is discharged from the filter bags via the openings thereof. The cleaned gas is discharged into a nozzle house associated with the respective filter chambers so as to be conducted, via outlet valves, to an outlet duct which is common to the filter chambers. On the clean gas side in the filter bags as well as in the nozzle house, there prevails during operation a negative pressure, which is normally generated by a fan which is arranged on the clean gas side downstream of the filter installation.

As the gas passes from outside and through the filter bags, the gas is cleaned by its dust being deposited on the exterior of the filter bags while forming a dust cake. The cleaning of the filter bags to remove this dust cake is carried out by a pressure medium in the form of compressed air pulses being injected into the filter bags in a direction opposite to the gas filtering direction. The rows of filter bags are cleaned successively, a compressed air pulse being generated and transmitted at the same time to all filter bags in a row by means of a cleaning unit arranged for each row. Each such cleaning unit comprises in the nozzle house a nozzle pipe, which extends above and in parallel with the associated row of filter bags, and a nozzle pipe bend connected thereto. The nozzle pipe has a distribution pipe with a plurality of vertically downwardly projecting pipe sockets which are connected thereto and which are each positioned straight above a filter bag opening in the row. The function of these pipe sockets is to direct, by deflecting, the compressed air pulse via nozzles into the respective filter bags. The pipe sockets usually have a diameter which is 1.5–2 times greater than the diameter of the nozzle of the respective pipe sockets. The nozzles consist of circular holes of varying diameter, which are formed in the distribution pipe. The distribution of the diameters of the nozzles along the nozzle pipe is determined empirically in relation to its total number of nozzles, thereby obtaining a uniform distribution of the compressed air pulse. The function of the nozzles thus is to distribute, by throttling, the compressed air pulse along the nozzle pipe.

One end of the nozzle pipe is closed and the other end is connected to a 90° nozzle pipe bend. The nozzle pipe bend, which extends through the roof of the nozzle house, is in turn connected to a vertical pressure pipe, which is attached by welding to a compressed air tank, which is common to all nozzle pipes in one and the same filter chamber, via a valve which is mounted on the compressed air tank. The valve can be of e.g. the type disclosed in Swedish Patent Specification 9303679-6. The elements here defined thus constitute the above-mentioned filter bag cleaning unit.

During cleaning of the filter bags, the valve is temporarily opened to establish a connection between the compressed air tank and the nozzle pipe and transmit, through the nozzle pipe and its nozzles and the associated pipe sockets, a compressed air pulse to each of the filter bags in the row. Such a nozzle pipe as described above is thus used to clean each row of filter bags by compressed air pulses in prior-art manner, by releasing the dust which during operation of the installation has got stuck in and on the walls of the filter bags. The dust cake formed on the filter bags will then come loose and fall off.

It is now most desirable to increase the filtering surface of the filter installation per unit of volume by first of all arranging the rows of filter bags closer together in the respective filter chambers. A more compact and thus less expensive filter installation is there-by-obtained, at the same time as effective cleaning, by one and the same compressed air pulse, of an essentially larger number of filter elements is rendered possible. It would in fact be possible to arrange each row of filter bags closer together by means of the above-described nozzle pipes. This means, however, that the speed and, thus, the pressure drop of the cleaned gas in the nozzle house will increase significantly owing to the obstacle which the nozzle pipes and the associated nozzle pipe bends constitute to the gas on its way out through the nozzle house. A greater pressure drop means that the amount of work that the fan must carry out will increase with increased power loss and, thus, the costs will increase. As a result, it is of course desirable to minimise this pressure drop while maintaining or even reducing the height of the nozzle house. Finally, it is also most desirable to considerably decrease the number of nozzle pipes in the respective filter chambers in the filter installation since the costs for each nozzle pipe and, consequently, each cleaning unit are high.

OBJECTS OF THE INVENTION

In view of what has been said above, it is thus an object of the present invention to provide a device for effective cleaning of a considerably larger number of filter elements, such as filter bags, at the same time in a fabric filter installation by means of pressure medium pulses, said device making it possible to increase, in a simple and considerably less expensive manner, the filtering surface of the fabric filter installation per unit of volume.

A further object of the present invention is to provide an effective reduction of the pressure drop of the gas on the clean gas side, while maintaining or even reducing the height of the nozzle house.

SUMMARY OF THE INVENTION

According to the present invention, these objects are achieved by a device which is of the type mentioned by way of introduction, and which is characterised in that the nozzle elements are adapted to direct pressure medium pulses into the upper open ends of the filter elements in at least two juxtaposed rows of filter elements. The filter elements in these rows are thus cleaned simultaneously by the pressure medium pulses injected into these. This makes it possible, first of all, to arrange the rows of filter elements closer together, which implies that the filtering surface per unit of volume can be increased in a simple and considerably less expensive manner. Moreover, the invention permits a considerable decrease of the number of devices, which results in an effective reduction of the pressure drop.

One embodiment of the device, in which the nozzle elements are adapted to direct pressure medium pulses into the filter elements in two juxtaposed rows of filter elements, is characterised in that the nozzle elements preferably are uniformly distributed along the distribution pipe and arranged such that they alternatingly project on either side of the distribution pipe. An alternative embodiment of the device is characterised in that the nozzle elements are uniformly distributed in pairs along the distribution pipe and arranged such that they opposite to each other project on either side of the distribution pipe.

A further embodiment of the device, in which the nozzle elements are adapted to direct pressure medium pulses into the filter elements in three juxtaposed rows of filter elements, is characterised in that the nozzle elements are distributed along the distribution pipe and arranged in pairs such that nozzle elements opposite to each other project on either side of the distribution pipe, and that at least one nozzle element projects vertically downwards, between at least one pair of nozzle elements.

At least one, especially each nozzle element preferably has a pipe socket and a nozzle. The nozzle is preferably arranged at the free end of the pipe socket and has an inlet and an outlet, the inlet having a cross-sectional area decreasing in the direction of the outlet and the outlet having an essentially constant cross-sectional area. This results in an advantageous deflection of the pressure medium pulse at small pressure losses. By means of the inlet of the nozzle, a throttling of the pressure medium pulse is effected, thereby obtaining a uniform distribution of the pressure medium pulse between the respective nozzles along the device. Moreover, a straight downwardly directing of the deflected pressure medium pulse into the respective filter elements is carried out by means of the outlet of the nozzle. The centre axis of the pipe sockets projecting on both sides of the distribution pipe makes an angle with the axial vertical plane of the distribution pipe, which preferably is 20–40°, especially 30°. This results in an optimisation of the distance between the rows of filter elements and the arrangement thereof in relation to each other and the distance between the nozzles of the device and the openings of the filter elements, as well as the weight of the device.

Preferably, the distribution pipe is centred above two or three rows of filter elements and extends essentially in parallel with these.

According to the present invention, both an increased filtering surface per unit of volume and effective cleaning of the filter elements are provided in this manner by the transmission of the pressure medium pulse from the distribution pipe to the respective filter elements thus taking place at small pressure losses, as well as an effective reduction of the pressure drop.

BRIEF DESCRIPTION OF THE DRAWINGS

An embodiment according to the present invention will now be described in more detail with reference to the accompanying drawings, in which:

FIG. 2 is a side view and shows part of a device in FIG. 1 according to the present invention.

DESCRIPTION OF THE PREFERRED EMBODIMENT

Figure 1:
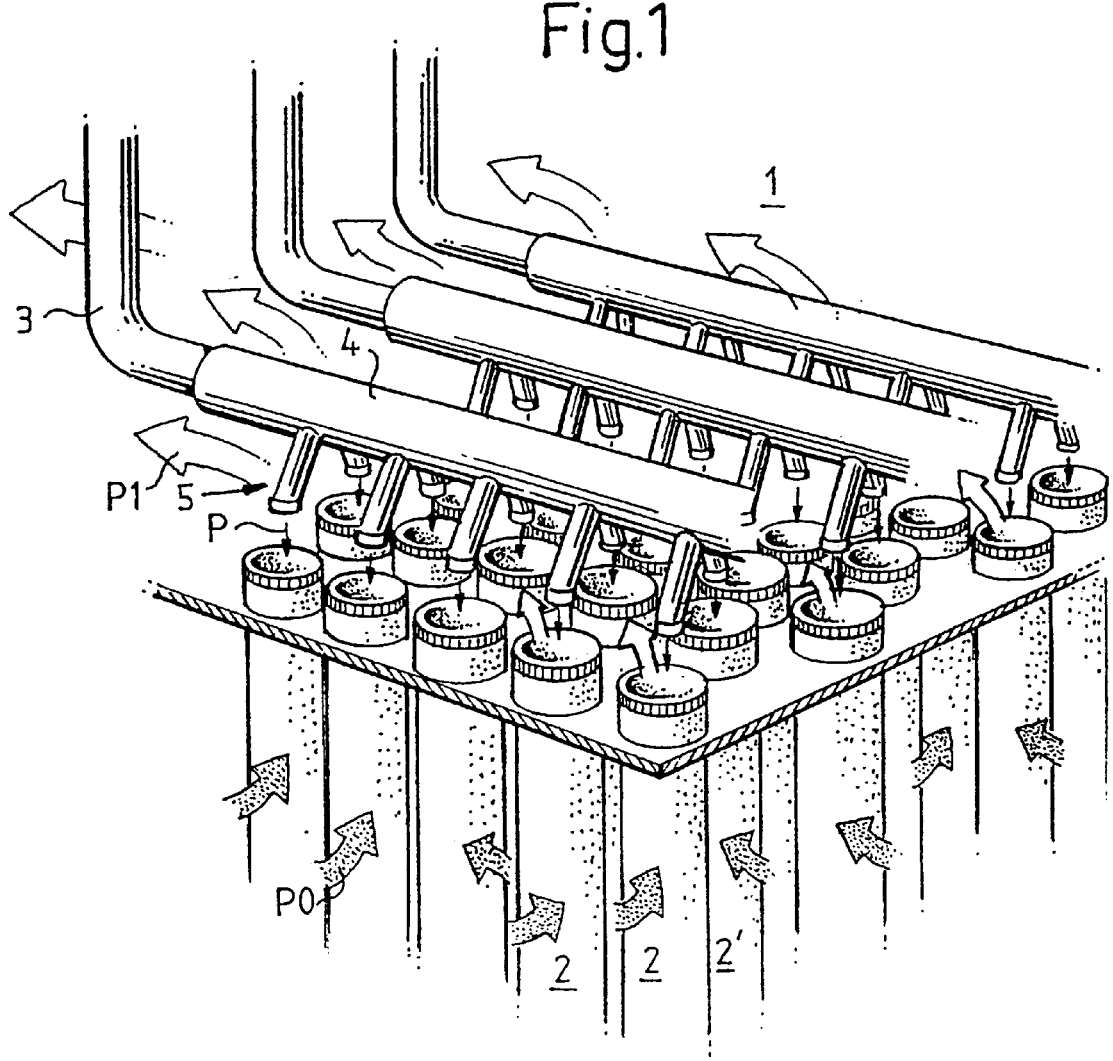
FIG. 1 is a perspective view and shows part of a filtering chamber and the associated nozzle house in a filter installation provided with a plurality of inventive devices.

FIG. 1 is a perspective view of three devices which according to the present invention consist of nozzle pipes. They are arranged in parallel and juxtaposed in a filter chamber and the associated nozzle house 1 in a filter installation, in which nozzle pipes each included in a filter element cleaning unit thus can be used. The nozzle pipes are arranged midway between and above two juxtaposed rows of vertically arranged filter bags 2, 2' for transmission of compressed air pulses P thereto. The filter chamber contains a plurality of parallel rows (for instance 20 rows) of filter bags 2, 2' with alternatingly an odd and an even number of filter bags 2, 2' in each row (for instance 15 and 16 filter bags, respectively).

A gas polluted with dust, as indicated by the arrows P0, is conducted into the filter chamber to be filtered and cleaned by the gas passing from the outside and through the filter bags 2, 2', its dust being deposited on the exterior of the filter bags while forming a dust cake. The cleaned gas, as indicated by the arrows P1, is discharged from the filter bags 2, 2' via openings thereof which are directed upwards, and is discharged from the filter chamber through its nozzle house 1 via outlet valves (not shown) in the further nozzle house wall, i.e. behind the nozzle pipes and nozzle pipe ends 3 of the above-mentioned filter element cleaning units. The cleaned gas thus passes between the filter element cleaning units on its way out from the nozzle house 1. On the clean gas side in the filter bags 2, 2' as well as in the nozzle house 1 there thus prevails during operation a negative pressure, which is generated by a fan arranged on the clean gas side downstream of the filter installation.

Figure 3:
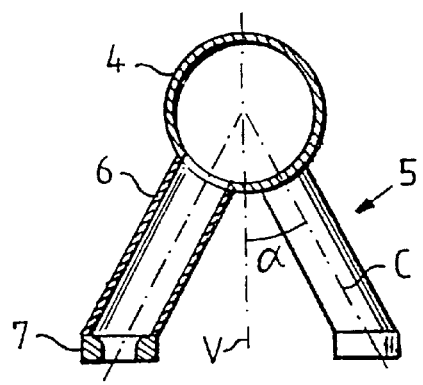
FIG. 3 is a cross-sectional view of the device in FIG. 2 according to the present invention.

FIG. 2 is a side view and shows a part of a nozzle pipe according to the present invention for transmitting compressed air pulses P to two rows of filter bags 2, 2' at the same time. In the embodiment shown, the nozzle pipe is arranged, as described above, midway between and above two juxtaposed rows of filter bags 2, 2'. The nozzle pipe comprises a distribution pipe 4 having a plurality of (for instance 31) nozzle elements 5 connected thereto. These are uniformly distributed along the distribution pipe 4 and arranged such that they alternatingly project on both sides of the distribution pipe 4. Each nozzle element 5, in turn, consists of a pipe socket 6 and a nozzle 7, which by deflection transmit a compressed air pulse P to the respective filter bags 2, 2' when cleaning the filter bags. The centre axis C of the pipe socket 6 thus makes an angle α of 30° with the axial vertical plane V of the distribution pipe 4, as shown in FIG. 3. In the shown embodiment, each nozzle 7 is arranged at the free end of the pipe socket 6 and positioned straight above its filter bag opening.

The function of the pipe socket 6 thus is to deflect the compressed air pulse P from the distribution pipe to the respective filter bags 2, 2' in the two rows, while the function of the specially, ideally designed nozzle 7 is to perform the following in an optimum fashion: deflect the compressed air pulse P, distribute it by throttling and direct it straight down into the respective filter bags 2, 2', i.e. the compressed air pulse P is distributed as uniformly as possible along the nozzle pipe to the filter bags 2, 2', at minimum pressure losses. To achieve this distribution of the compressed air pulse P, a distribution of the diameters of the nozzles is determined empirically in relation to the total number of nozzles 7 of the nozzle pipe. Each nozzle 7 has an inlet and an outlet, the inlet having a circular cross-sectional area which continuously decreases in the direction of the outlet, and the outlet having a circular, constant cross-sectional area. In this manner, the above-mentioned function which is advantageous for the nozzle is accomplished.

The nozzle pipe is at one end closed and at its other end connected to a 90° nozzle pipe bend 3. The nozzle pipe bend 3 extending through the roof of the nozzle house 1 is in turn connected to a vertical pressure pipe 8 which is connected by welding to a compressed air tank 9 which is common to all nozzle pipes in one and the same filter chamber, via a valve 10. The valve 10 is of the type disclosed in Swedish Patent Specification 93030679-6.

During cleaning of the filter bags, the valve 10 is temporarily opened to establish a connection between the compressed air tank 9 and the nozzle pipe 1 and transmit, via the nozzle pipe and its nozzle element 5, a compressed air pulse to each of the filter bags 2, 2' of the two rows. The filter bags are released from the dust which during operation of the installation has stuck in and on the walls of the filter bags. The dust cake formed on the filter bags thus comes loose and falls down.

By means of the nozzle pipe according to the shown embodiment, effective cleaning of two juxtaposed rows of filter bags 2, 2' is effected by one and the same compressed air pulse P. By means of this nozzle pipe, twice as many filter bags can thus be cleaned at the same time, compared with a conventional nozzle pipe of the same length. Above all, the inventive nozzle pipe makes it possible to increase, in a simple and considerably less expensive manner, the filtering surface of the filter installation per unit of volume since the rows of filter bags 2, 2' can now be arranged closer together without the disadvantages which in this case are associated with a conventional nozzle pipe. Consequently, this results in a more compact filter installation. The nozzle pipe according to the present invention further results in an effective reduction of the pressure drop owing to the lower flow rate of the gas on the clean gas side since the number of filter bag cleaning units and thus also the number of nozzle pipes and nozzle pipe bends 3 in the nozzle house 1 have been at least halved. The flow cross-section, which the gas passes in the nozzle house on its way out, is, for instance, approximately doubled according to the shown embodiment. This also permits alternatively the advantage that the height of the nozzle house can be decreased.

In addition, the nozzle pipe according to the shown embodiment results in a considerably less expensive mounting, owing to a halving of the amount of the above-mentioned mechanical components such as nozzle pipes, nozzle pipe bends 3, pressure pipes 8 and valves 10, as well as electrical components and electrical wires for the solenoids (electromagnetic valves) belonging to the valves 10. A further advantage that follows from the nozzle pipe according to the shown embodiment is that half as many holes need be made in the pressure tank 9 and, consequently, half as many welds for connecting the pressure pipes 8 and the valves 10 to the compressed air tank 9. These welds are especially expensive owing to the high certificating requirements placed thereon. The risk that the compressed air tank 9 is deformed in connection with welding will also be considerably smaller since the distances in the longitudinal direction of the compressed air tank between the holes on the upper side for the valves 10 and the holes on the underside for the pressure pipes 8 in the compressed air tank 9 will be approximately twice as great as in prior-art technique.

The invention is, of course, not restricted to the embodiment described above but can be modified in various ways within the scope of the accompanying claims.

For instance, the nozzle elements 5 can be arranged to direct compressed air pulses P into the filter bags 2, 2' in three juxtaposed rows of filter bags 2, 2', the nozzle elements 5 being distributed along the distribution pipe 4 and arranged according to a repeated pattern such that nozzle elements opposite to each other project in pairs on both sides of the distribution pipe 4, and such that one nozzle element 5 projects vertically downwards midway between each pair of nozzle elements 5.

For instance, the nozzle elements 5 can be adapted to direct compressed air pulses P into the filter bags 2, 2' in three juxtaposed rows of filter bags 2, 2', the nozzle elements 5 being distributed along the distribution pipe 4 and arranged according to a repeated pattern such that four nozzle elements opposite to each other project in pairs on both sides of the distribution pipe 4, and such that two nozzle elements 5 project vertically downwards midway between said pairs of nozzle elements 5.

In the embodiments which comprise nozzle elements projecting vertically downwards from the distribution pipe 4, each nozzle may consist of a preferably circular hole formed in the distribution pipe 4.

We claim:

1. A device for cleaning filter elements having upper open ends, in a filter installation for filtering of polluted gas passing, during operation, from the outside and through the filter elements, in which installation filter elements are juxtaposed in a plurality of essentially parallel rows, the device comprising:

an essentially horizontal distribution pipe, the pipe extending essentially in parallel with juxtaposed rows of filter elements to be cleaned;

a pressure medium source connected to the pipe via a valve; and a plurality of nozzle elements connected to the distribution pipe, the nozzle elements being adapted to direct pressure medium pulses into upper open ends of the filter elements of at least two of the juxtaposed rows of filter elements, wherein the nozzle elements are uniformly distributed along the distribution pipe and are arranged such that they alternatingly project on either side of the distribution pipe.

2. The device as claimed in claim 1, wherein at least one nozzle element includes a pipe socket and a nozzle.

3. The device as claimed in claim 2, wherein the at least one nozzle is arranged at a free end of the pipe socket.

4. The device as claimed in claim 2, wherein the pipe has a center axis extending on both sides of the distribution pipe to form an angle with an axial vertical plane of the distribution pipe between 20–40°.

5. The device as claimed in claim 3, wherein the at least one nozzle has an inlet and an outlet, the inlet having a cross-sectional area decreasing in a direction of the outlet, and the outlet having an essentially constant cross-sectional area.

6. The device as claimed in claim 3, wherein the pipe has a center axis extending on both sides of the distribution pipe to form an angle with an axial vertical plane of the distribution pipe between 20–40°.

7. The device as claimed in claim 1, wherein the distribution pipe is centered above at least two rows of filter elements.

8. The device as claimed in claim 1, wherein each nozzle element includes a pipe socket and a nozzle.

9. The device as claimed in claim 8, wherein the at least one nozzle is arranged at a free end of the pipe socket.

10. The device as claimed in claim 9, wherein the at least one nozzle has an inlet and an outlet, the inlet having a cross-sectional area decreasing in a direction of the outlet, and the outlet having an essentially constant cross-sectional area.

11. A device for cleaning filter elements having upper open ends, in a filter installation for filtering of polluted gas passing, during operation, from the outside and through the filter elements, in which installation filter elements are juxtaposed in a plurality of essentially parallel rows, the device comprising:

an essentially horizontal distribution pipe, the pipe extending essentially in parallel with juxtaposed rows of filter elements to be cleaned;

a pressure medium source connected to the pipe via a valve; and a plurality of nozzle elements connected to the distribution pipe, the nozzle elements being adapted to direct pressure medium pulses into upper open ends of the filter elements of at least two of the juxtaposed rows of filter elements;

wherein the nozzle elements are adapted to direct pressure medium pulses into the filter elements in three juxtaposed rows of filter elements, the nozzle elements being distributed along the distribution pipe and arranged in pairs such that nozzle elements opposite to each other project on either side of the distribution pipe, and such that at least one nozzle element projects vertically downwards, between at least one pair of nozzle elements.

12. The device as claimed in claim 11, wherein the at least one nozzle is arranged at a free end of the pipe socket.

13. The device as claimed in claim 12, wherein the at least one nozzle is arranged at a free end of the pipe socket.

14. The device as claimed in claim 11, wherein the distribution pipe is centered above at least two rows of filter elements.

15. A device for cleaning filter elements having upper open ends, in a filter installation for filtering of polluted gas passing, during operation, from the outside and through the filter elements, in which installation filter elements are juxtaposed in a plurality of essentially parallel rows, the device comprising:

an essentially horizontal distribution pipe, the pipe extending essentially in parallel with juxtaposed rows of filter elements to be cleaned;

a pressure medium source connected to the pipe via a valve; and a plurality of nozzle elements connected to the distribution pipe, the nozzle elements being adapted to direct pressure medium pulses into upper open ends of the filter elements of at least two of the juxtaposed rows of filter elements, wherein at least one nozzle element includes a pipe socket and a nozzle, and the at least one nozzle has an inlet and an outlet, the inlet having a cross-sectional area decreasing in a direction of the outlet, and the outlet having an essentially constant cross-sectional area.

16. The device as claimed in claim 15, wherein the nozzle elements are uniformly distributed along the distribution pipe and are arranged such that they alternatingly project on either side of the distribution pipe.

17. The device as claimed in claim 15, wherein the nozzle elements are uniformly distributed in pairs along the distribution pipe and are arranged such that nozzle elements opposite to each other project on either side of the distribution pipe.

18. The device as claimed in claim 15, wherein the pipe has a center axis extending on both sides of the distribution pipe to form an angle with an axial vertical plane of the distribution pipe between 20–40°.

19. The device as claimed in claim 17, wherein the at least one nozzle is arranged at a free end of the pipe socket.

20. The device as claimed in claim 19, wherein the at least one nozzle is arranged at a free end of the pipe socket.

* * * * *